United States Patent [19]

Tada

[11] Patent Number: 4,858,023
[45] Date of Patent: Aug. 15, 1989

[54] IMAGE READ APPARATUS

[75] Inventor: Kaoru Tada, Osaka, Japan

[73] Assignee: Minolta Camera Kabushiki Kaisha, Osaka, Japan

[21] Appl. No.: 168,694

[22] Filed: Mar. 16, 1988

[30] Foreign Application Priority Data

Mar. 17, 1987 [JP] Japan .................................. 62-64983

[51] Int. Cl.$^4$ ............................................. H04N 1/40
[52] U.S. Cl. .................................... 358/471; 358/443
[58] Field of Search ................. 358/80, 280, 282, 284, 358/294

[56] References Cited

U.S. PATENT DOCUMENTS

| | | | |
|---|---|---|---|
| 4,661,843 | 4/1987 | Sekizawa | 358/80 |
| 4,698,669 | 10/1987 | Sekizawa | 358/80 |
| 4,717,954 | 1/1988 | Fujita | 358/80 |
| 4,731,662 | 3/1988 | Udagawa | 358/80 |
| 4,734,762 | 3/1988 | Aoki | 358/80 |

FOREIGN PATENT DOCUMENTS

| | | |
|---|---|---|
| 55-112685 | 8/1980 | Japan . |
| 59-161970 | 9/1984 | Japan . |
| 60-91762 | 5/1985 | Japan . |
| 60-139080 | 7/1985 | Japan . |

Primary Examiner—Howard W. Britton
Attorney, Agent, or Firm—Price, Gess & Ubell

[57] ABSTRACT

An image read apparatus provided with a reader which scans an original and a reference white pattern and reads the image by an image sensor, a line RAM which temporarily stores therein the read difference white pattern, a conversion memory which has a conversion table for performing shading correction and gamma correction and which outputs a correction signal from an image signal of the reference white pattern and an original image signal, and a binary digitizing circuit which binary-digitizes the correction signal by a predetermined method and outputs it to an output circuit, so as to simultaneously perform the shading and gamma correction of the original image signal and reads a halftone faithfully to the original to output the read image signal to an output device.

6 Claims, 5 Drawing Sheets

IMAGE READ APPARATUS

BACKGROUND OF THE INVENTION

1. Field of the Invention

The present invention relates to an image read apparatus which reads images by an image sensor, and more particularly to an image read apparatus simultaneously performing shading correction and gamma correction of images read out by the image sensor.

2. Description of the Prior Art

The conventional image read apparatus processes image signals as shown in FIG. 1. Namely, one-dimensional image sensor 1 consisting of photoelectric conversion element outputs voltage proportional to density of an original, the voltage being amplified by an amplifier 2 and converted into a digital value by an AD converter 3. Next, the digitized image signal is corrected by a shading correction circuit 4 to correct for nonuniformity in quantity of light from a light source with respect to each element and variation in sensitivity thereof at the image sensor 1, and then by a gamma correction circuit 5 to have the input-output relation matched with the characteristic of an output device. The image signal thus corrected, next, is binary-digitized by a binary digitizing converter 6 for a binary output device, wherein a dither method or a density pattern method is used for representing the halftone.

The shading correction, as disclosed in, for example, the Japanese Patent Laid-Open Gazette No. Sho-55-112685, reads correction data prestored in a correction memory and performs the correction.

The gamma correction has been disclosed in, for example, the Japanese Patent Laid-Open gazette No. Sho-59-161970, Patent Laid-Open Gazette No. Sho-60-91762 and Patent Laid-Open Gazette No. Sho-60-139080.

It is indispensable for the image read apparatus to keep linearity of an input and an output. However, the output images are different from each other in characteristic and picture quality due to the output device, so that it is required for the image read apparatus to process the image signal to match the output device, the processing being carried out by the gamma correction circuit.

The image read apparatus may be connected to a plurality of output devices. In this case, it is disadvantageous from the point of manufacturing when the processing method (circuit) is different for every output device. Hence, the processing should be performed in the same circuit structure.

Also, the method wherein the shading circuit and gamma circuit are separate from each other produces larger quantization error when CCD output variation is larger in comparison to when it is smaller, thereby reducing an amount of the information available for faithfully reproducing the halftone. Also, even when the binary digitizing converter circuit changes its threshold value by seeking a histogram of amplitude of the image signal, the amount of information largely lacking which can possibly lead to a deterioration of picture quality.

SUMMARY OF THE INVENTION

In order to solve the above problem, the present invention has been designed.

A first object thereof is to provide an image read apparatus which has a memory storing a conversion table for carrying out shading correction and gamma correction with the ability to exchange for another or reload the content thereof, thereby enabling the image signal to be corrected by the same circuit structure regardless of an output device.

A second object of the invention is to provide an image read apparatus which simultaneously carries out the shading correction and gamma correction to reduce a quantization error, thereby enabling the to be reproduced faithfully close to an original.

A third object of the invention is to provide an image read apparatus which simultaneously carries out the shading correction and gamma correction to thereby lower the cost required for correction.

The above and further objects and features of the invention will more fully be apparent from the following detailed description with accompanying drawings.

DESCRIPTION OF THE PREFERRED EMBODIMENTS

Figure 1:
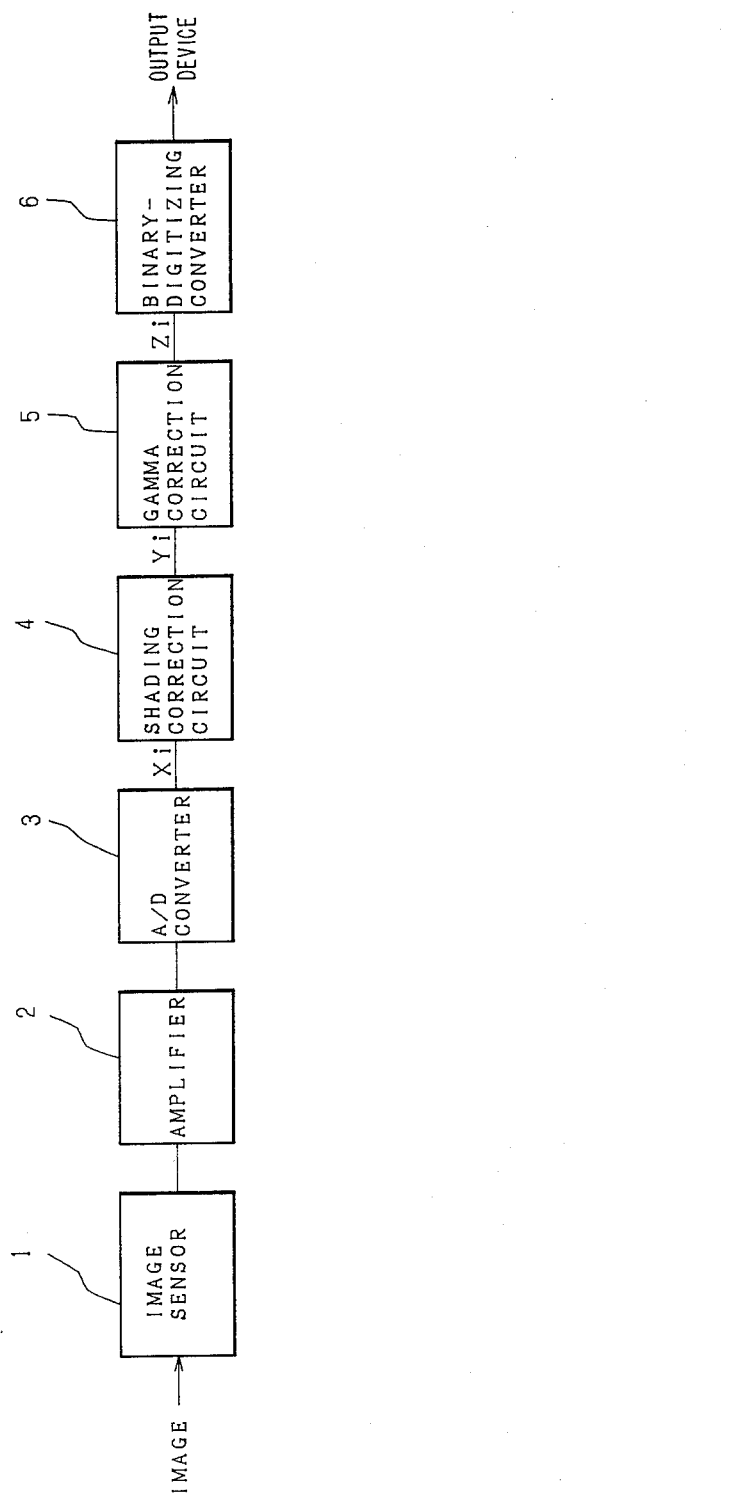
FIG. 1 is a block diagram of structure of the conventional image read apparatus.
Figure 2:
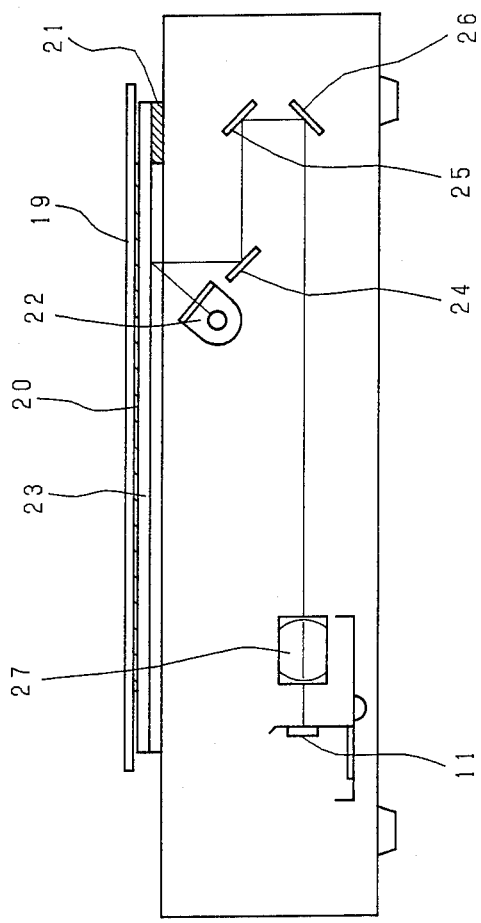
FIG. 2 is a typical structural side view of an embodiment of an image read apparatus of the invention, showing read means and scanning means in structure.
Figure 3:
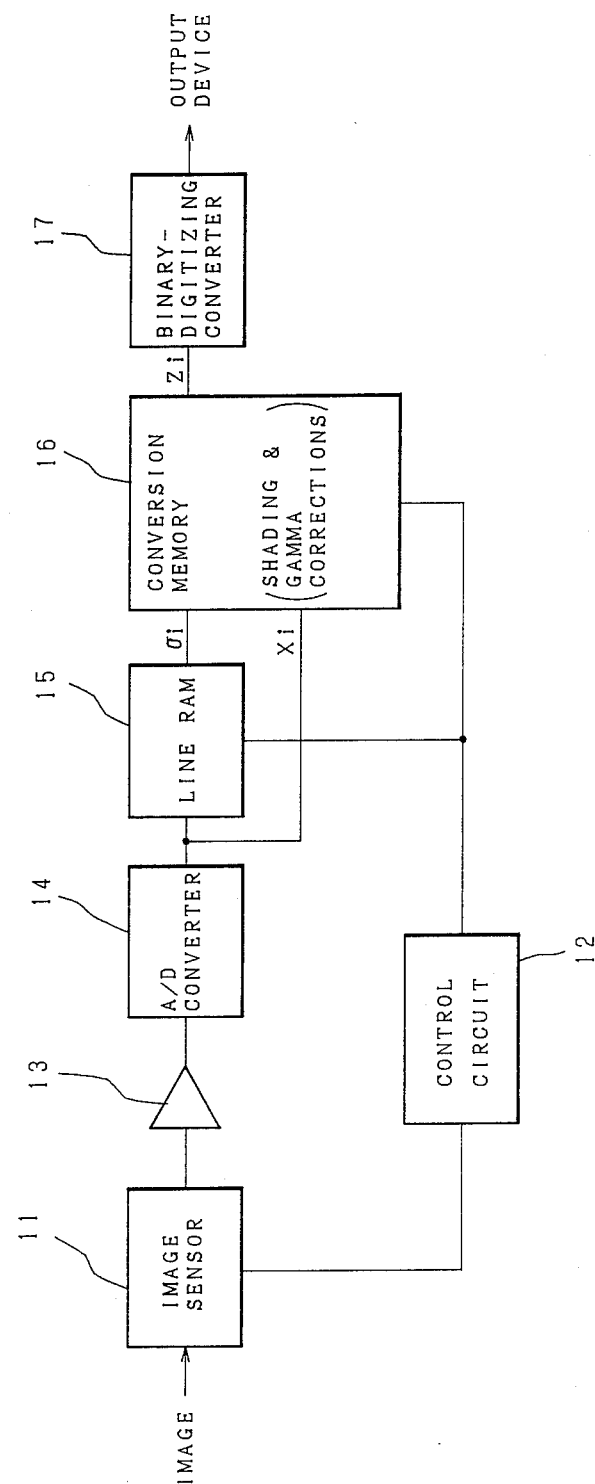
FIG. 3 is a block diagram of the image read apparatus of the invention.

Next, an embodiment of an image read apparatus of the invention will be detailed in accordance with the drawings. FIG. 2 is a typical structural side view of an embodiment of an image read apparatus of the invention, in which read means and scanning means are shown, and FIG. 3 is a block diagram of the embodiment. In FIG. 2, a reference numeral 20 designates an original placed on a transparent glass plate 23, so that the image information to be read is written on one side surface of the plate 23. At one end edge of the original glass plate 23 is provided a flat-bar-like-shaped reference white pattern plate 21, which is equal in lengthwise length to a widthwise length of the original glass plate 23. Under the original glass plate 23 is provided a light source 22 for exposing and scanning the original 20. Slantwise under the light source 22 is provided integrally therewith a first mirror 24 having a lengthwise length larger than a widthwise length of the original 20 and facing slantwise upwardly at the mirror surface. The light source 22 and first mirror 24 are horizontally movable by a driving device (not shown) in length enough to thoroughly scan the original 20 and reference white pattern plate 21. A second mirror 25 is mounted on the position in the apparatus body moderately horizontally apart from the first mirror 24 so as to enable the reflected light from the first mirror 24 to be incident on a third mirror 26. The third mirror 26 is integrally mounted with the second mirror 25 and faces it to horizontally reflect the reflected light from the second mirror 25, and movable together with the second mirror 25 in synchronism with the light source 22 at half the speed of the light source 22 in order to fix an optical path length of the reflected light.

A lens 27 allowing the reflected light from the third mirror 26 to be incident on a one-dimensional image sensor 11 consisting of a plurality of photoelectric conversion elements (CCD) is provided moderately horizontally apart from the third mirror 26, the image sensor 11 is mounted at the exit side of the lens and opposite thereto.

The scanning means comprises the light source 22, first through third mirrors 24, 25 and 26, and lens 27.

Each image sensor 11 is connected to an amplifier 13 amplifying an analog output signal of the image sensor 11 and a control circuit 12 controlling the output timing of the analog output signal, the amplifier 13 is connected at the output terminal thereof through an A/D converter 14 to a line RAM 15 of a first memory means storing therein the reference white pattern and to a conversion memory 16 of a second memory means which stores correction data for correcting an image signal and outputs the data corresponding to the image signal. The conversion memory 16 is connected to an output device (not shown) through a binary digitizing circuit 17 of binary digitizing means. Also, the control circuit 12 is connected to the line RAM and conversion memory 16. Also, the read means comprises the photoelectric conversion element 11, scanning means, and A/D converter 14.

Next, explanation will be given on the operation of the image read apparatus of the present invention.

At first, the light source 22 irradiates the reference white pattern plate 21 provided at one end edge of the original glass plate 23. The reflected light is incident on the image sensor 11 through the first mirror 24, second mirror 25, third mirror 26, and lens 27 so that an analog image signal is generated to input into the line RAM 15 through the amplifier 13 and A/D converter 14 and be stored as the digitized white image signal in the line RAM 15.

Next, the original 20 placed on the original glass plate 23 is irradiated by the light source 22 and reflected light from one line of the original 20, similarly as in the above, is incident on the photoelectric conversion element 11. The reflected light incident thereon is converted into the analog image signal by the photoelectric conversion element 11, amplified by the amplifier 13, and input into the conversion memory 16 as an original image signal digitized by the A/D converter 14. The image sensor 11 comprises a plurality of charge-coupled devices (CCD), and the i-th signal generated from the i-th CCD is represented by $\sigma i$ when the white image is read out, and by $X i$ when the original image is read out. The white image signal $\sigma i$ is temporally stored in the line RAM 15 and then transmitted to the conversion memory 16 in which is stored a conversion table to be discussed below and for giving a correction image signal $Z i$ of the correction data corresponding to the original image signal $X i$ and white image signal $\sigma i$, so that when the original image signal $X i$ and white image signal $\sigma i$ are input into the conversion memory 16, a correction image signal $Z i$ is output therefrom, and is converted into the binary value by the binary digitized circuit and then delivered to the output device (not shown). In the binary value, the dither method or the density pattern method is used for the halftone image.

Upon completing the digitization as to one line of the original, the next line thereof is read out by the photoelectric conversion element 11 and then, similarly, the image read-out will be performed.

Next, explanation will be given on the shading correction and gamma correction at the conversion memory 16.

Figure 4:
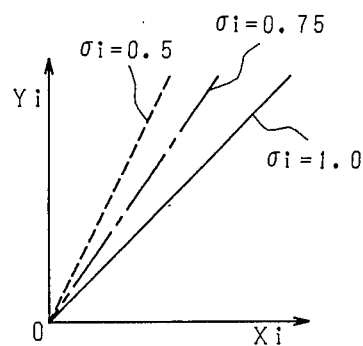
FIG. 4(a) and FIG. 4(b) are graphs showing the input/output relation between the conventional shading correction and the gamma correction.
Figure 4:
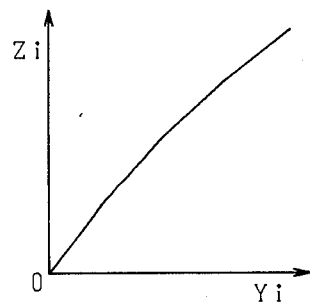
Figure 5:
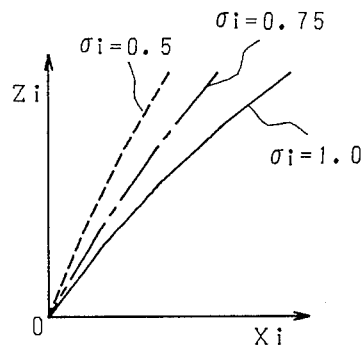
FIG. 5 is a graph showing the input-output relation between the corrections in the embodiment of the invention.

FIG. 4(a) is a graph showing the shading correction, FIG. 4(b) the gamma correction thereafter, and FIG. 5 the two corrections simultaneously carried out in the embodiment of the invention, in which the axis of ordinate takes the output signal after correction and the axis of abscissa the input signal before correction. Hence, in FIG. 4(a) the axis of ordinate shows the output signal $Yi$ after the shading correction, the axis of abscissa the original image signal $Xi$ and in FIG. 4(b), the axis of ordinate shows the correction image signal $Zi$, the axis of abscissa the output signal $Yi$ after the shading correction, and in FIG. 5, the axis of ordinate takes the correction image signal $Zi$ and the axis of abscissa the original image signal $Xi$. Also, in FIG. 4(a) and FIG. 5, if the maximum value of the white image signal $\sigma i$ is assumed to be 1, the broken line shows 0.5 of the same, the one-dot chain line shows 0.75 of the same, and the solid line shows 1 of the maximum value of the same, respectively.

Upon performing the shading correction, as shown in FIG. 4(a), the output signal $Yi = f(Xi, \sigma i)$ corresponding to the original image signal $Xi$ and white image signal $\sigma i$ is given after the shading correction so that, when the white image signal $\sigma i$ is constant, the output signal $Yi$ after the shading correction is proportional to the original image signal $Xi$, FIG. 4(a) shows the signal $\sigma i$ normalized with respect to the maximum value. Next, when the gamma correction is carried out, as shown in FIG. 4(b), the correction image signal $Zi = g(Yi)$ is given to the output signal $Yi$ after the shading correction. The correction image signal $Zi$ changes in a nonlinear manner with respect to the output signal $Yi$ after the shading correction.

On the other hand, the embodiment of the image read apparatus of the invention simultaneously performs the shading correction and gamma correction, whereby the correction output signal $Zi = g(f(Xi, \sigma i))$ is adapted to be given to the original image signal $Xi$ and white image signal $\sigma i$ as shown in FIG. 5.

Accordingly, the conversion table at the conversion memory 16 includes the correction image signal $Zi$ corresponding to the output levels of original image signal $Xi$ and white image signal $\sigma i$. A first table shows in graph the aforesaid relation.

In addition, since the white image signal $\sigma i$ usually is not 50% or less in conversion to the maximum value of quantity of light from the light source 22, the signal $\sigma i$ is assumed to vary in a range of 50 to 100%, and the original image signal $Xi$ is assumed to vary in a conversion range of 0 to 63 of the A/D conversion.

TABLE 1

| $\sigma$ | Conversion Table X | | | | | |
|---|---|---|---|---|---|---|
| | 0 | 1 | 2 ... | 31 ... | 39 ... | 63 |
| 31 | 0 | 2 | 4 ... | 63 | | |
| 32 | 0 | 2 | 4 ... | | | |
| . | | | | | | |
| . | | | | | | |
| 39 | 0 | 2 | 3 ... | | 63 | |
| . | | | | | | |

TABLE 1-continued

| | Conversion Table X | | | | | |
|---|---|---|---|---|---|---|
| σ | 0 | 1 | 2... | 31... | 39... | 63 |
| 63 | 0 | 1 | 2 | | | 63 |

Figure 6:
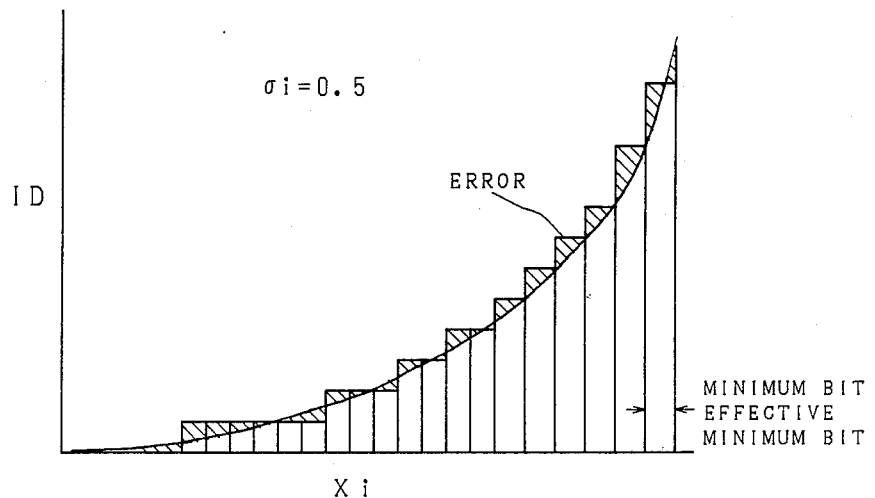
FIGS. 6 and 7 are graphs depicting quantization errors in the corrections of the embodiment of the invention and the conventional example.
Figure 7:
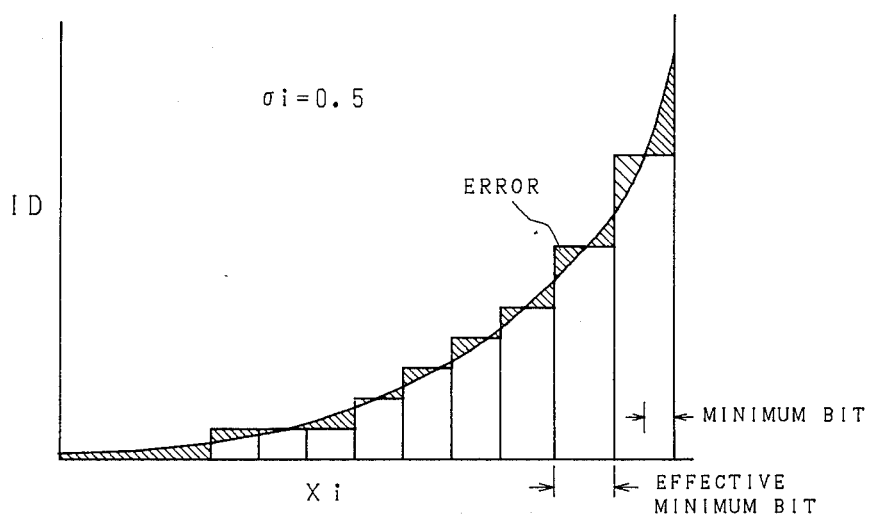

Thus, the embodiment of the invention carries out the shading correction and gamma correction at one step, so that the quantization error in the correction image signal Zi is smaller than that in the conventional example carrying out the same at two steps. FIGS. 6 and 7 are graphs separately showing the quantization errors in the embodiment of the invention and the conventional example, in which the axis of ordinate takes the image density and the axis of abscissa the original image signal Xi respectively. Also, in the drawings, the curves analogically show the actual relation between the real image density and the original image signal, the bar graphs show the relation between the image density of the correction image signal Zi and the original image signal Xi the oblique-line portions show the quantization errors.

In addition, FIG. 6 is a graph similar to FIG. 5, but in FIG. 5 black is represented by "0" and white by "1" so as to show the original image signal Xi. On the contrary, in FIG. 6 the black is represented by "1" and the white by "0" so as to the original image signal Xi is represented by the usual image density for clarifying the quantization error.

As shown in FIG. 6, since the embodiment of the invention carries out the quantization at one step, even in the worst case where the white image signal σi is deteriorated down to 50% in conversion to the amount of light (σi=0.5), the effective minimum bit unit of the correction image signal is one bit.

On the other hand, as shown in FIG. 7, the conventional example carries out the quantization at the two steps of the shading correction and gamma correction, whereby the quantization error in correction becomes the product of quantization error in the shading correction and that in the gamma correction. In the aforesaid worst case (when σi=0.5), the effective minimum bit unit of correction image signal Zi after the correction becomes 2 bits. Therefore, the quantization error in the embodiment of the invention is within one bit and that in the conventional example is within two bits. Hence, in the conventional example, the information thus often is lacking, whereby it is required to separately correct for the lack thereof. However, the embodiment of the invention, which is small in the quantization error, can represent the halftone faithfully to the original without the aforesaid correction.

Also, in the case where the conversion memory 16 is made of a ROM, when the output device is changed, the ROM needs only be changed into the ROM matched with the output characteristic, and the RAM is used to change the output equipment, the conversion table in the RAM need only be rewritten.

Furthermore, since the image read apparatus of the invention performs the shading correction and gamma correction at one step, the correction is performable at a low cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An image reading apparatus comprising:
   a read means for scanning and reading an original placed on an original loading table and a reference white pattern provided at one edge of the original loading table, said read means comprised of an image sensor for reading images and further comprised of a scanning means for scanning said images and transferring said images to said image sensor;
   A first memory means for temporarily storing therein an image signal of said read-out reference white pattern;
   a second memory means for storing therein correction data regarding shading correction and correction with respect to an input-output characteristic of an output device connected thereto and for outputting as a corrected image signal said correction data corresponding to an original image signal and an image signal of said reference white pattern read-out from said first memory means corresponding to said original image signal, said second memory means comprised of a memory being accessed with said original image signal and said image signal of said reference white pattern as address signals, respectively; and
   a binary digitizing means for binary-digitizing said corrected image signal and for outputting said binary-digitized corrected image signal to said output device.

2. An image read apparatus as set forth in claim 1, wherein said memory is made of a ROM whose content is set according to the input-output characteristic of said output device.

3. An image read apparatus as set forth in claim 1, wherein said memory is made of a RAM and is rewritten according to said output device different in said input-output characteristic.

4. An image read apparatus comprising:
   an image sensor comprised of a one-dimensional charge-coupled-device (CCD) array for reading images of an original;
   a scanning means for scanning the original to transmit the image thereof to said image sensor;
   a reference white pattern plate disposed in parallel to the disposed direction of said image sensor within the scanning area of said scanning means and having a predetermined length in said disposed direction;
   a first memory means for storing an image signal of said reference white pattern of said reference white pattern plate having been read through said scanning means and said image sensor prior to scanning the original;
   a second memory means for storing therein correction data regarding shading correction and correction with respect to the input-output characteristic of an output device connected thereto and for outputting as a correction image signal said correction data being accessed with an original image signal and said image signal of said reference white pattern which is read-out by said first memory means corresponding to the position of said original image signal in said disposed direction, said second memory means comprised of a memory accessed with said original image signal and said image signal of said reference white pattern as address signals, respectively; and a binary digitizing means for binary-digitizing said correction image signal and for outputting said binary-digitized corrected image signal to said output device.

5. An image read apparatus as set forth in claim 4, wherein said memory is made of a ROM whose content is set according to the input-output characteristic of said output device.

6. An image read apparatus as set forth in claim 4, wherein said memory is made of a RAM and is rewritten according to said output device different in the input-output characteristic.

* * * * *